Figure 1:
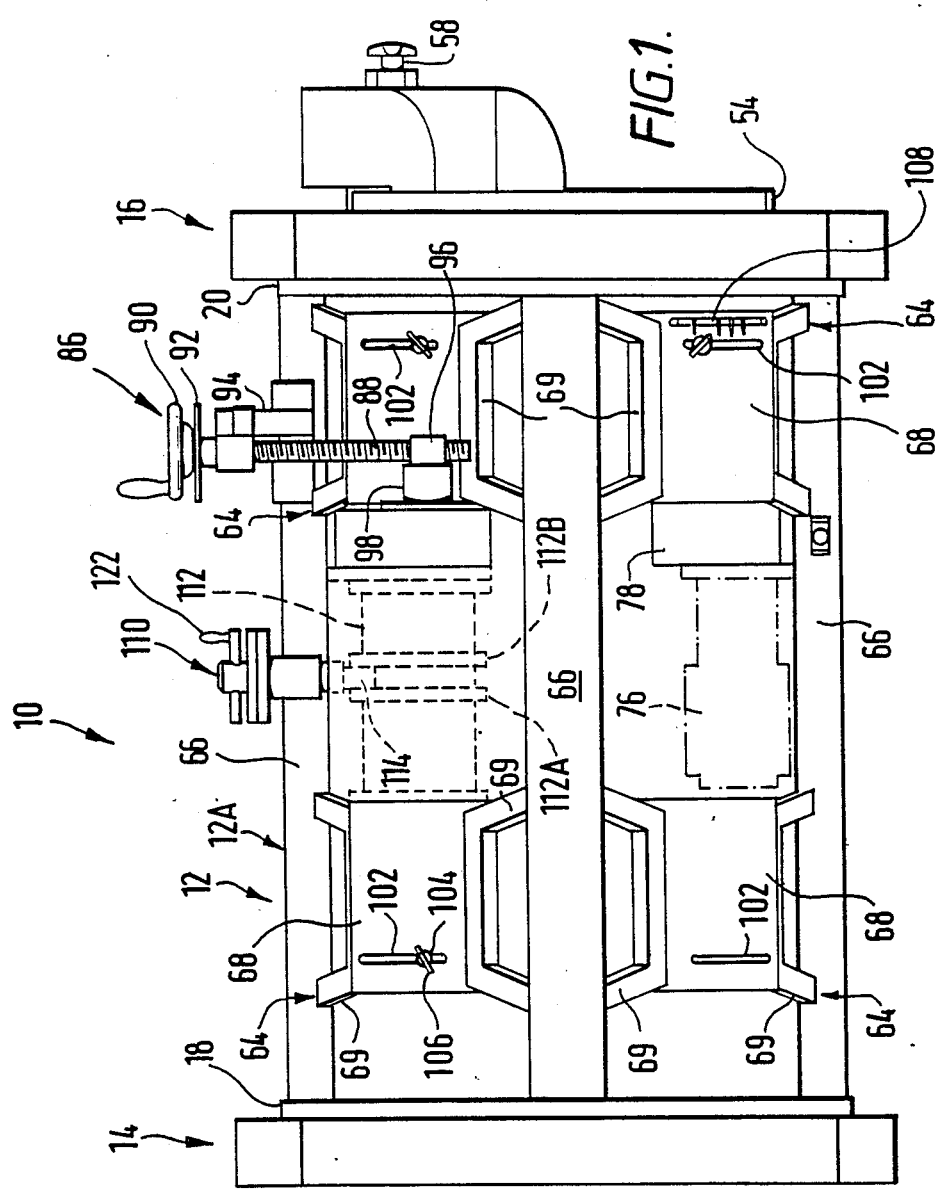

United States Patent [19]

Silk

[11] Patent Number: 4,922,772
[45] Date of Patent: May 8, 1990

[54] MACHINE TOOLS
[75] Inventor: George R. Silk, Sandiacre, England
[73] Assignee: Silk Engineering (Derby) Limited, Derby, England
[21] Appl. No.: 156,818
[22] Filed: Feb. 17, 1988
[30] Foreign Application Priority Data
Feb. 19, 1987 [GB] United Kingdom ............... 8703935
[51] Int. Cl.⁵ .......................................... B23B 05/08
[52] U.S. Cl. ..................................... 82/128; 82/113; 82/114
[58] Field of Search ................. 82/2 E, 4 C, 4 R, 20, 82/70.2, 83, 113, 114, 128; 51/241 B, 241 S, 90; 409/179; 83/508.2, 508.3

[56] References Cited
U.S. PATENT DOCUMENTS

| 2,675,655 | 4/1954 | Strait ........................................ 51/90 |
| 2,747,274 | 5/1956 | Willard et al. ........................ 30/97 |
| 2,796,792 | 6/1957 | Dias ....................................... 82/4 R |
| 2,842,238 | 7/1958 | Shaw et al. ............................ 82/4 C |
| 3,183,636 | 5/1965 | Kelley et al. ......................... 51/241.5 |
| 3,650,936 | 3/1972 | Towle ..................................... 51/90 |
| 4,359,917 | 11/1982 | Wilger et al. . |

FOREIGN PATENT DOCUMENTS
913214 12/1962 United Kingdom .
1130953 10/1968 United Kingdom .
1557966 12/1979 United Kingdom .
2027371 2/1980 United Kingdom .

Primary Examiner—Frederick R. Schmidt
Assistant Examiner—Jack W. Lavinder
Attorney, Agent, or Firm—Oliff & Berridge

[57] ABSTRACT

A machine tool (10) intended for machining components on site comprises a frame (12) mounted on bearings (14, 16). Each bearing (14, 16) comprises an inner fixed bearing (14C, 14D, 16C, 16D) clamped to a work piece (22) and an outer rotatable bearing (14A, 14B, 16A, 16B). The frame (12) supports one or more spindles (74) having two cutting tools (82, 84) which are driven by air motors (76) through gear boxes (78). The frame (12) is driven by an air motor (60) through a reduction gear box (56) and annular gear (54). The bearings (14, 16) are both split to enable the machine to be assembled around a work piece (22) so that the tool can machine diameters (22A, 22B).

13 Claims, 5 Drawing Sheets

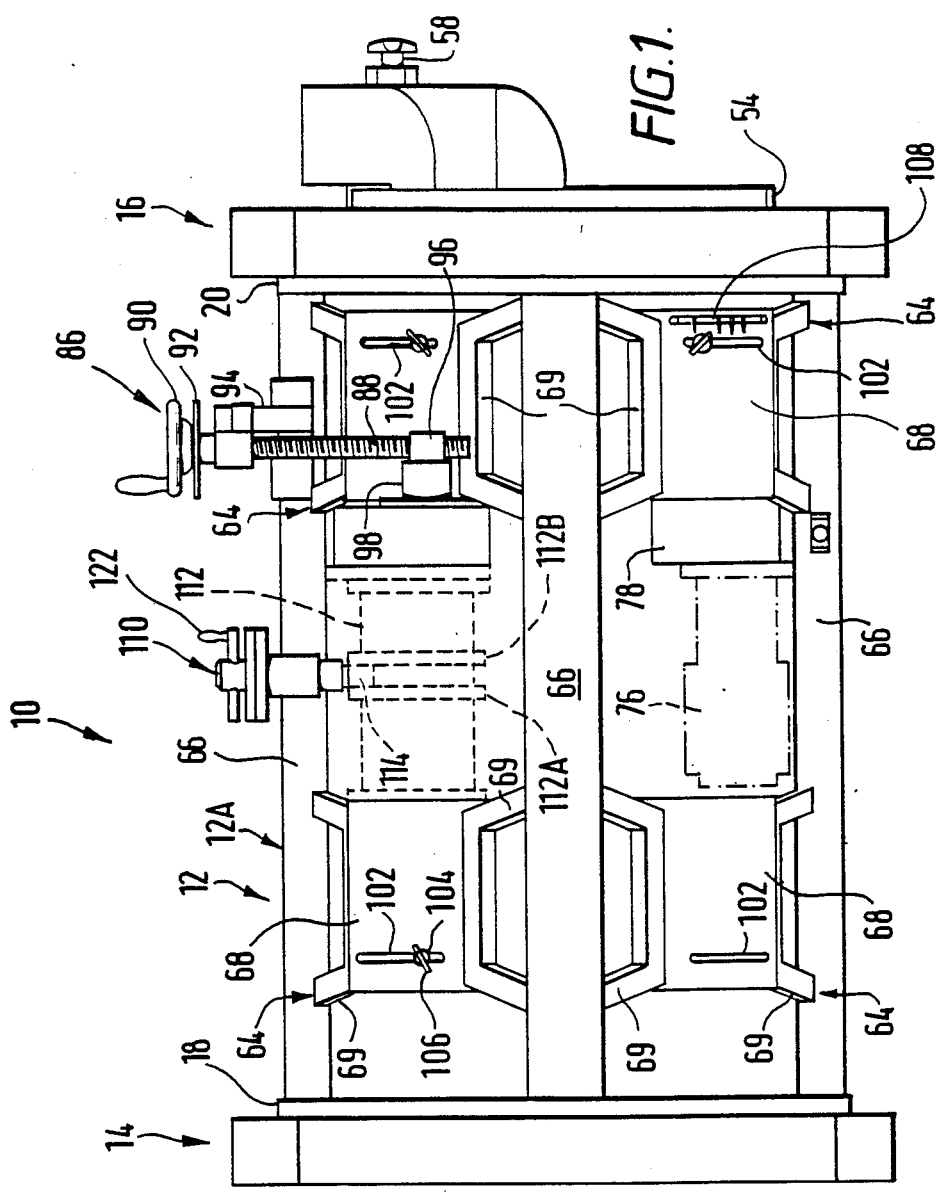

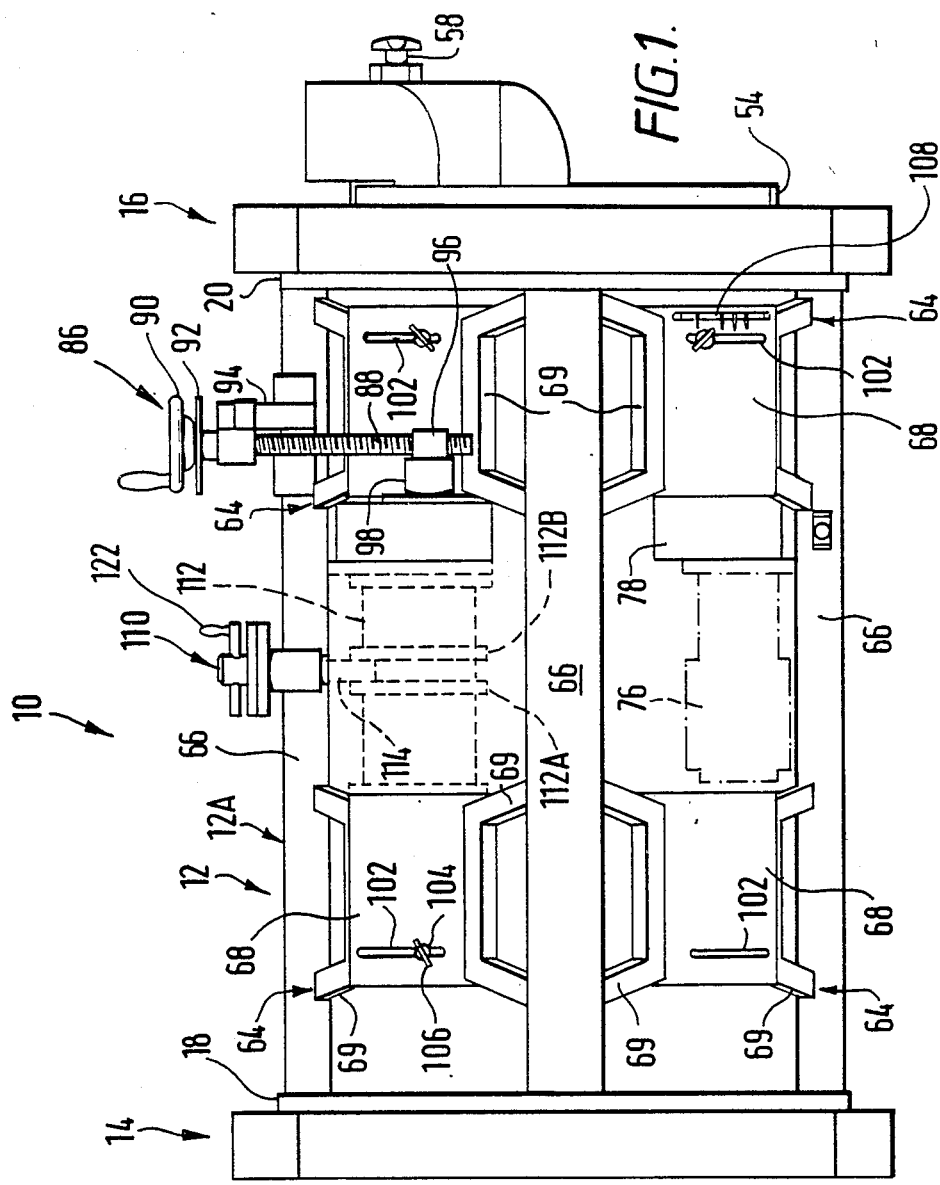

MACHINE TOOLS

This invention relates to machine tools and in particular to machine tools which are used to machine components on site. In particular, though not exclusively, the present invention is concerned with providing a machine tool which can be used to machine one or more diameters of a work piece and where the machine tool is capable of being assembled around the work piece as well as being placed over the work piece in an assembled condition.

Accordingly, the present invention provides a machine tool comprising a frame arranged to be secured to and to be rotatable upon a work piece, the frame including bearing means located adjacent the ends of the frame, each bearing means comprising an outer bearing attached to and rotatable with the frame, and an inner bearing having clamping means arranged to attach each inner bearing to a work piece, and driving means arranged to drive the frame rotatably relative to the work piece, the frame including at least one cutting tool support means, at least one cutting tool being mounted on the support means, and drive means for rotatably driving the cutting tool, the cutting tool also having feed means to adjust the position of the cutting tool relative to the work piece, the frame drive means and the cutting tool drive means being operable to cause the cutting tool support means to rotate about the work piece, and for the cutting tool to machine a surface of revolution of the work piece.

Preferably the inner outer bearings of both bearing means are split to enable the machine tool to be placed around a work piece.

The clamping means can comprise a plurality of radially movable jaws operated by a split rotatable cam plate which is provided with a locking mechanism.

The clamping means can also include one or more jaws which are individually actuated by a screw engaging an inclined surface on each individually adjustable jaw.

The driving means can comprise a split ring gear attached to one of the outer bearings and driven by an air motor through a pinion.

The cutting tool can be mounted on a rotatable shaft which is eccentrically mounted in one or more housings and is driven by an air motor through a gear box.

Each housing can be movable through an arc in order to provide an arcuate feed for the cutting tool.

The assembly of cutting tool shaft and housings can also be movable axially to provide a lateral feed.

The cutting tool shaft can have a cutting tool at each end so that two diameters of the work piece can be machined simultaneously.

The machine tool can also have two cutting tool shafts, each shaft having two cutting tools, one of said shafts providing a roughing cut and the other shaft providing a finishing cut on the diameters being machined.

The present invention will now be more particularly described with reference to the accompanying drawings in which, FIG. 1 is a general arrangement of one form of machine tool according to the present invention.

Figure 2:
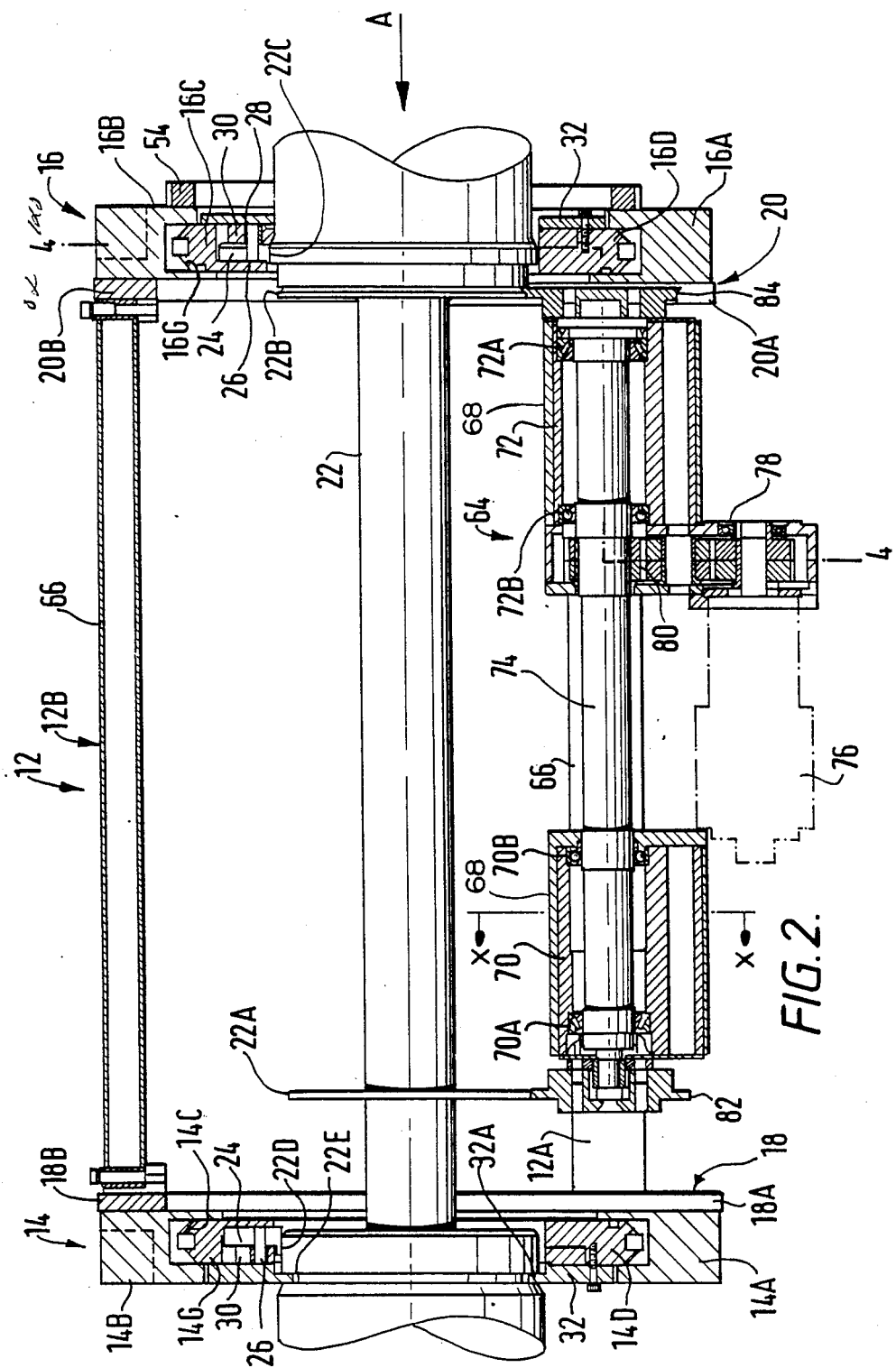
Figure 4:
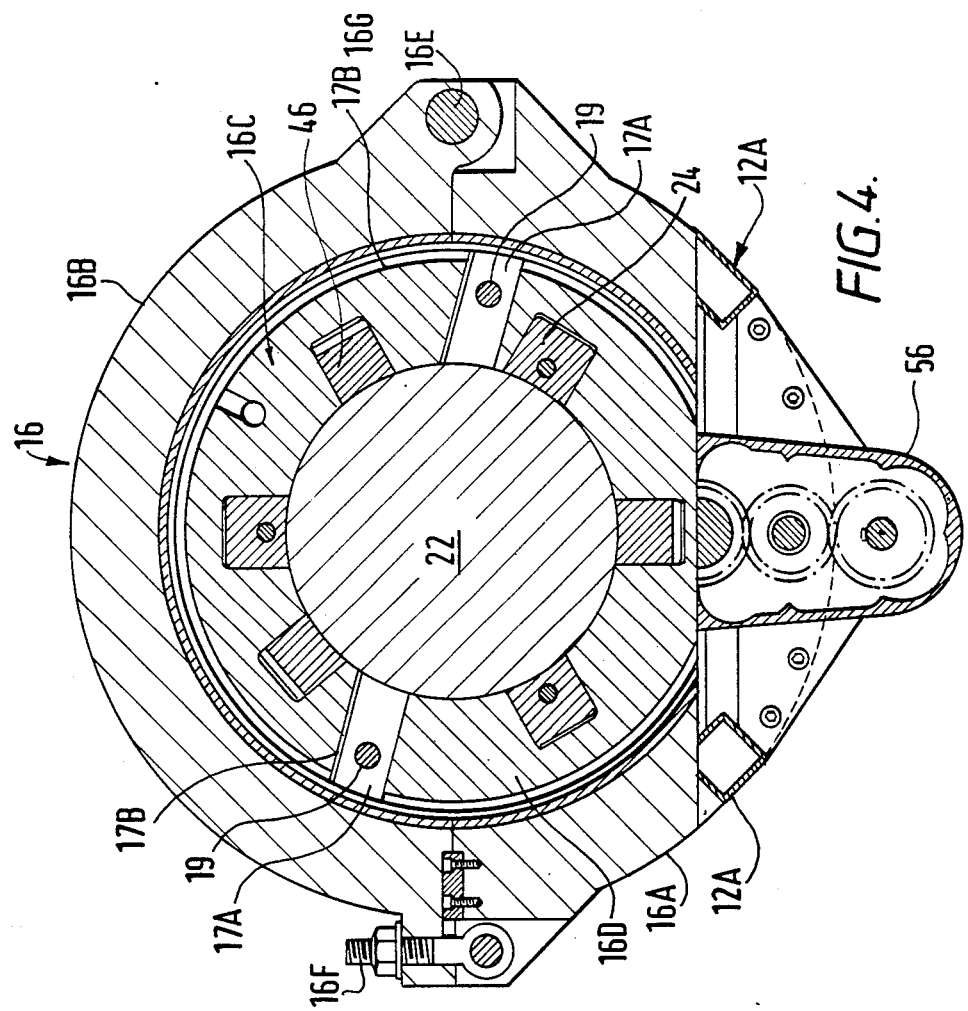
Figure 3:
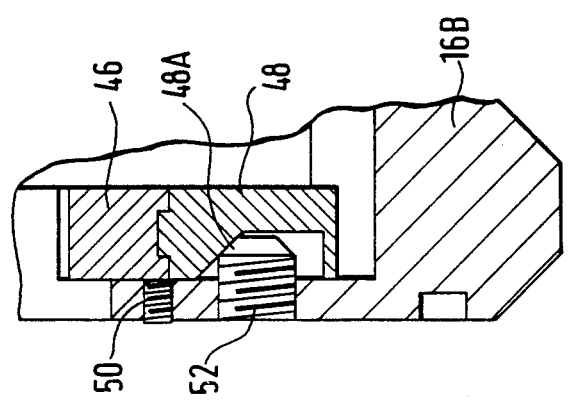
Figure 5:
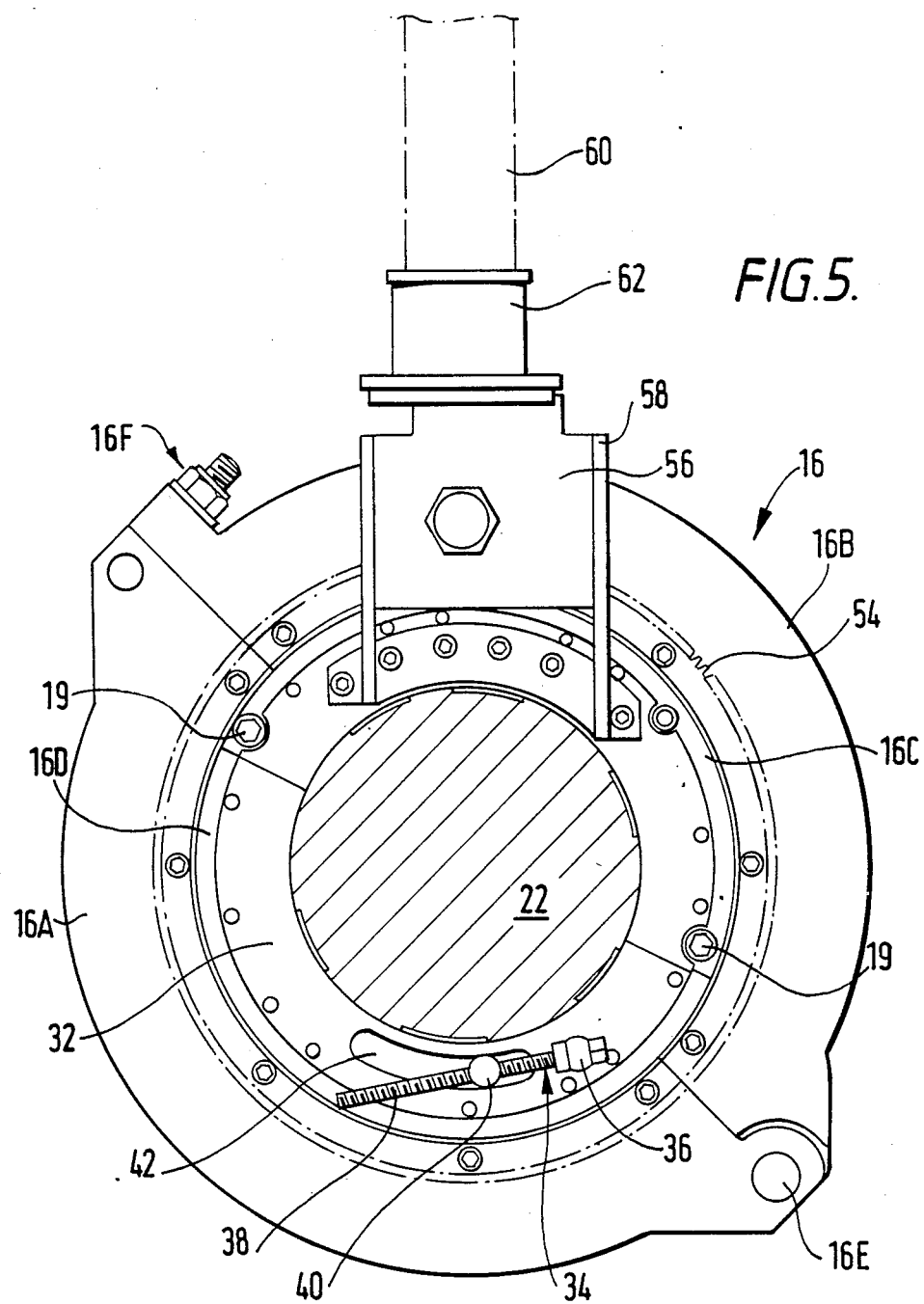
Figure 6:
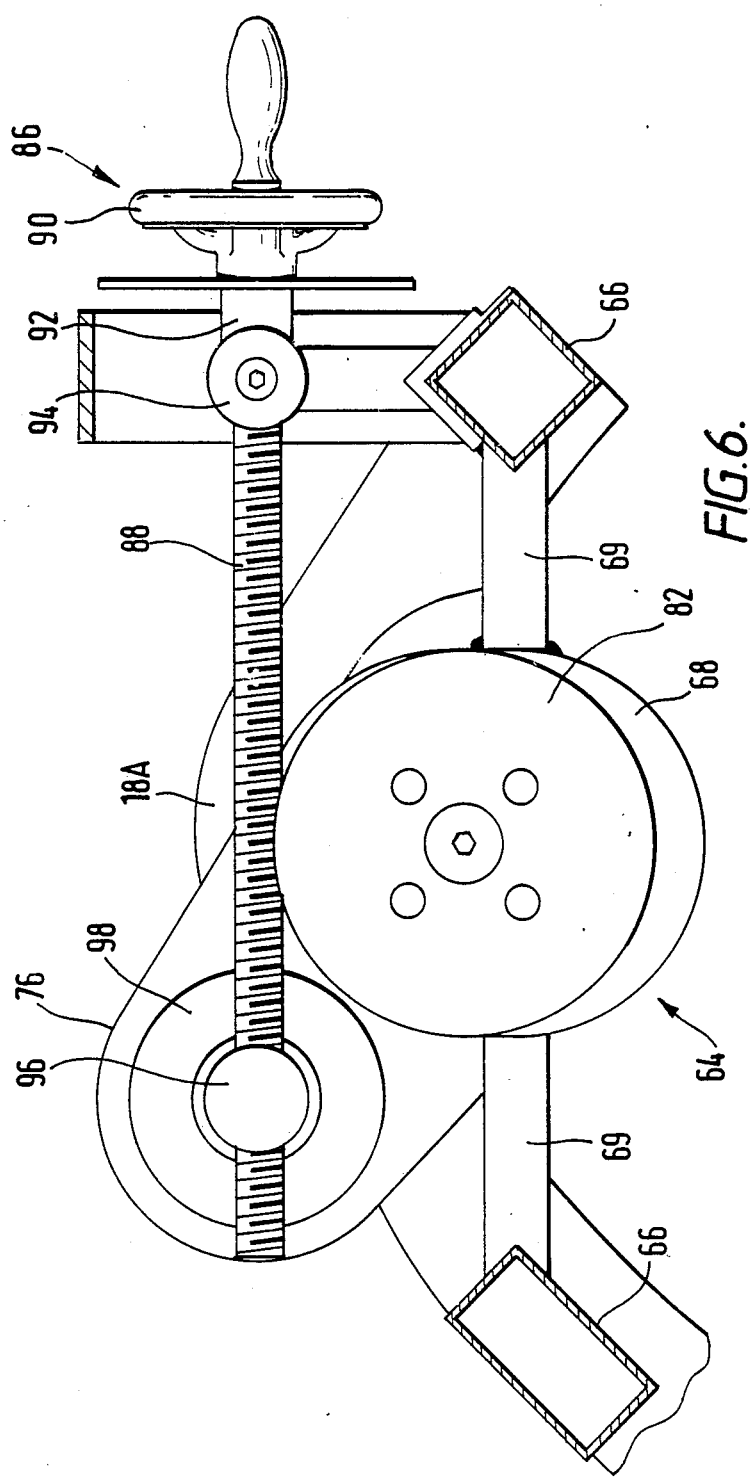
Figure 7:
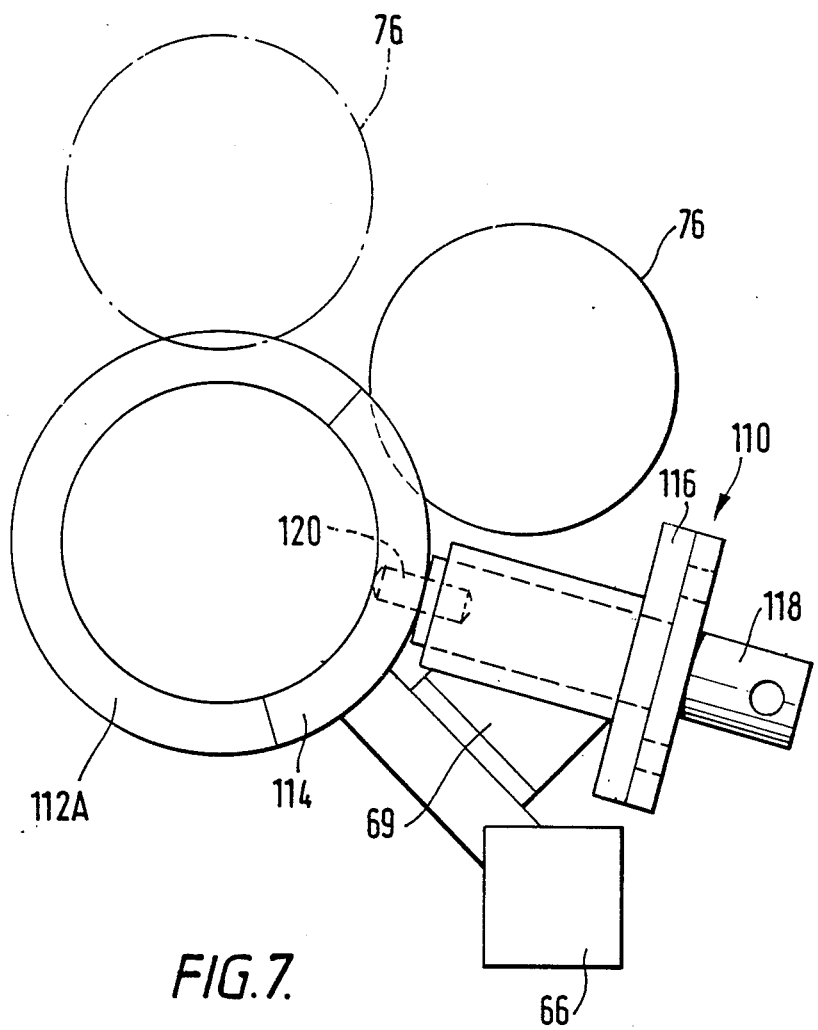
Figure 8:
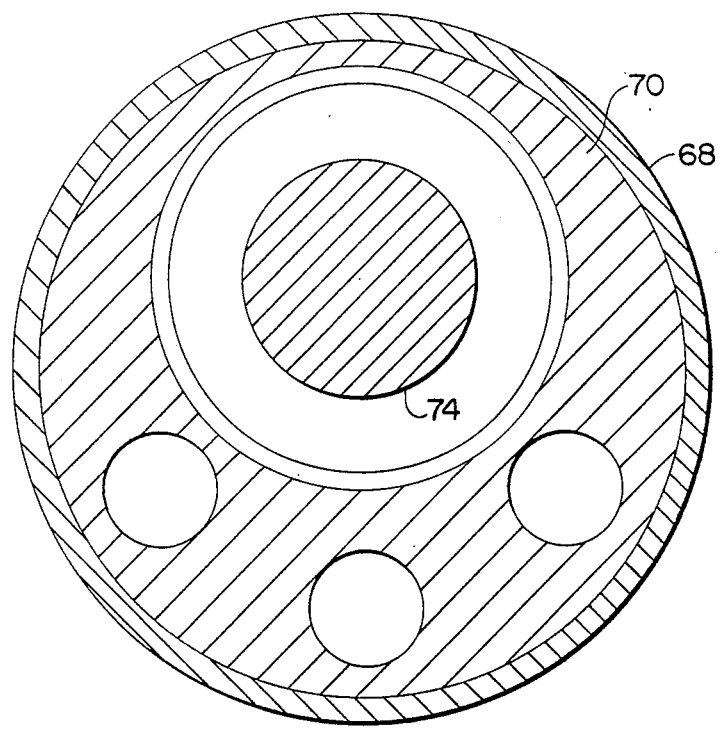

FIG. 2 shows in more detail the attachment of the machine tool shown in FIG. 1 to a work piece, and one of the cutting tool spindles, FIG. 3 shows a detail of the clamping mechanism of the machine tool shown in FIG. 1, FIG. 4 shows a section on line 4—4 in FIG. 2, FIG. 5 shows a view on arrow A in FIG. 2, and including an air motor and drive, FIG. 6 shows the arcuate adjustment mechanism of the cutting tool spindle of the machine tool shown in FIG. 1, FIG. 7 shows a detail of the lateral feed of the cutting tool spindle of the machine tool shown in FIG. 1 and, FIG. 8 shows a section on line X—X in FIG. 2.

Referring to FIGS. 1 and 2 a machine tool 10 comprises a frame 12 formed in two parts 12A and 12B. The frame 12 is attached at each end to split bearing means 14 and 16 through split rings 18 and 20. The bearing means 14 and 16 comprise an outer rotatable bearing formed in two parts 14A, 14B, and 16A, 16B, and inner fixed bearings also in two parts 14C, 14D and 16C, 16D. The rings 18 and 20 are both split into two halves 18A, 18B and 20A, 20B respectively. The frame parts 12A and 12B are attached to the respective halves of the bearing means and rings 14, 16 and 18, 20.

In FIGS. 4 and 5, it will be seen that the outer bearing part 16A, 16B is formed in two halves pivoted at 16E and provided with a swivel bolt and clamping nut assembly 16F. The inner bearing parts 16C, 16D are formed with engaging tongues and grooves 17A, 17B respectively which are secured together by dowels 19. The bearing means 14 is made up in a similar way.

Referring more particularly to FIGS. 2 to 5 inclusive in which the machine tool is shown in more detail and clamped to a work piece 22, the function of the machine is to machine the surfaces 22A and 22B which are solids of revolution, of the work piece. The split bearing parts 14C, 14D and 16D are clamped to the work piece 22 on diameters 22C and 22D, and the respective bearing parts 14A, 14B and 16A, 16B are rotatably movable with respect to the fixed bearing parts 14C, 14D and 16C, 16D on split bearing liners 14G and 16G respectively.

Each bearing part 14C, 14D and 16C, 16D is clamped to the work piece by three radially movable jaws 24 each of which have pins 26 engagable in cam slots 28 in a split cam plate 30. A split cover plate 32 is attached to each inner bearing and covers the cam plate, and a flange 32A on the inner bearing 14C, 14D engages with a groove 22E of the workpiece to locate the bearing means 14 with respect to the work piece.

An actuating and locking mechanism 34 (FIG. 5) is attached to both cover plates, and comprises an anchor pin 36 attached to the cover plate 32, a bolt 38 which passes through the anchor pin and engages with a nut 40 which is attached to the cam plate 30, the nut 40 projecting through a slot 42 in the cover plate. The bolt 38 is provided with a locking collar 44 to maintain the cam plate in any desired position.

Each inner bearing is also provided with three individually movable jaws 46 (FIGS. 3 and 4), each of which are mounted on a block 48 and retained by a screw 50. Each block 48 has a 45° angle inclined surface 48A which is engaged by a corresponding surface on adjusting screw 52.

A split annular gear 54 is attached to the outer bearing 16A, 16B and is in engagement with a pinion gear (not shown) of a reduction gear box 56 supported in a frame 58 which is attached to the cover plate 32. An air motor 60 is attached to the gear box through an adaptor block 62 and is supplied with a flow of compressed air (not shown), in order for the motor to drive the outer bearing 16A and therefore the frame 12 and outer bearing 14A, 14B rotatably with respect to the work piece 22.

The frame part 12A has two cutting tool support means 64 (FIG. 1), one of which is shown in more detail in FIG. 6. The frame parts 12A and 12B which are similar to one another each comprises three box section members 66 which are attached between the split ring halves 18A and 20A. Each support means 64 comprises two cylinders 68 attached to adjacent box sections 66 of the respective frame parts 12A and 12B by means of a pair of feet 69.

Each support means 64 carries two cutter housings 70 and 72 in the cylinders 68 and a drive shaft 74 is eccentrically mounted in each cutter housing in thrust bearings 70A, 72A and ball bearings 70B, 72B.

The drive shaft 74 is driven by an air motor 76 through a reduction gear box 78 mounted on the housing 72 and engaging with a gear wheel 80 on the drive shaft. The cutter shaft 74 carries a cutting tool 82 arranged to machine the surface 22A of the component, and a cutting tool 84 arranged to machine the surface 22B of the component.

Referring to FIG. 6 an arcuate tool feed mechanism 86 is shown mounted on one of the box section members 66 and is provided to move the cutting tools 82 and 84 in a radial sense. The feed mechanism comprises a lead screw 88 having an operating handle 90, and feed dial 92. The lead screw 88 is mounted for rotation in a thrust bearing (not shown) mounted in a bracket 94 which is secured to one of the members 66. The lead screw engages a nut 96 mounted for rotation on a bearing housing 98 of the gear box 76.

Each cylinder 68 has a slot 102 through which projects a stud 104 attached to the housing 70 and 72. Each stud is provided with a wing nut 106 enabling the housings to be clamped to the cylinders 68 and therefore clamp each cutter shaft 74 in position. A scale 108 is provided on one or more of the cylinder 68 to indicate the position of the respective cutter tools with respect the work piece.

Referring particularly to FIGS. 1 and 7, a lateral feed mechanism 110 is partly attached to one of the box sections 66 and comprises a part cylinder 112 attached to and between housings 70, 72 of the same drive shaft 74. The part cylinder 112 has two flanges 112A and 112B between which is located a block 114 of an arcuate annular form. The parts of the mechanism 110 attached to a box section 66 comprises a housing 116 fixed to the box section 66 and a spindle 118 which is attached to the block 114 by an eccentrically positioned pin 120. The spindle 118 can be rotated by a handle 122 and can be clamped to the housing 116 by nuts, and bolts passing through apertures 124. The housing 116 and spindle 118 are provided with a scale and indicator to show the amount of feed.

The machine tool 10 is assembled on the work piece 22 by firstly attaching the two parts 12A and 12B of the frame 12 to the corresponding rotatable halves of the bearing means 14 and 16, with the clamping bolt and nut assembly 16E and the corresponding assembly on bearing part 14A being released so that the two halves 14A, 14B and 16A, 16B of each bearing part 14, 16 are in the open position. Safety straps (not shown) bridging the halves 14A, 14B and 16A, 16B can be provided to keep these halves in the open position. The respective halves of the bearing liners 14G, 16G inner bearing parts 14C, 14D and 16C, 16D and the two halves of the cam plates 24 are placed in position. The two halves 14A, 14B and 16A, 16B of each bearing 14 and 16 are brought together and clamped in position by the respective assemblies 14F and 16F.

The machine tool is then centered on the work piece by means of the adjustable jaws 46 and when centred is clamped onto the diameters 22C and 22D by actuating the mechanisms 34, which moves the cam plates and locks them in position.

The two halves of the ring gear 54 are attached to the outer bearing 16A, 16B and the support frame 58, gear box 56 and air motor 60 are also attached to the cover plate 32.

The positions of the two cutter shafts 74 are then adjusted using the feed mechanism 86 so that one of the shafts 74 enables the respective cutters to provide a roughing cut on the diameters 22B and 22C whilst the cutters on the other shaft provide a finishing cut. It will be appreciated that rotation of the lead screw 88 of the feed mechanism 86 causes the housings 70 and 72 to rotate and, since the shaft 74 is mounted eccentrically in these housings, the shaft will move through an arc when the handle 90 on the lead screw 88 is operated.

The lateral position of the cutters with respect to the work piece can be adjusted within a narrow range, e.g. a total of 0.060 inches by means of the mechanism 110. Rotation of the wheel 122 causes the spindle 118 and the eccentrically mounted pin 120 to shift the block 114 to the left or right thereby moving drive shaft housings 70, 72, and drive shaft 74 to the left or right. When the motor 60, and the two motors 76 are operated, the frame 12 carrying both of the cutter spindles 74 will rotate about the work piece and both of the cutter spindles 74 will be rotating to enable the whole of both diameters 22A and 22B to be machined. It will be appreciated that the frame 12 will only need to rotate with respect to the work piece approximately three to four times and that the cutter spindles will be rotating at a considerably higher speed than that of the frame 12.

A machine tool according to the present invention enables components which cannot be removed from their intended site of operation to be machined accurately and quickly on site.

In cases where a roughing cut is not required, the machine need only be provided with one cutting spindle or, if provided with two cutting spindles, then the spindle intended for use to provide a roughing cut can be moved out of engagement. Also each cutting spindle need only be provided with a single cutting tool if only one diameter is to be machined. Any suitable type of cutting tool can be used, for example, a milling cutter. The cutters can be of the integral type or can have replaceable cutting inserts.

Whilst a machine tool according to the present invention is effectively constructed in two halves, pivotted together so that the tool can be assembled around a work piece, the machine tool can also be offered up to the work piece in a fully assembled condition providing that their is sufficient room for access and that the work piece is conveniently sized.

The machine tool can be modular or part-modular in construction. In particular, each cutting tool support 64 comprising two cylinders 68 and associated feet together with the drive shaft 74, cutters and housings 70 and 72 can be assembled as a single unit which can be readily attached to and detached from the appropriate frame part 12A or 12B. Such an arrangement allows a new cutter or cutters to be provided.

I claim:

1. A machine tool comprising a frame arranged to be secured to and to be rotatable upon a work piece, the frame including bearing means located adjacent each end of the frame, each bearing means comprising an outer bearing attached to and rotatable with the frame, and an inner bearing having clamping means arranged to attach each inner bearing to a work piece at spaced apart locations, and driving means arranged to drive the frame relative to the work piece, the frame including at least one rotatable shaft eccentrically mounted in two housings, the shaft arranged to be driven by an air motor through a reduction gear box attached to one of said housings, at least one rotatable milling cutting tool being mounted on the rotatable shaft, and drive means for rotatably driving the cutting tool, the cutting tool also having feed means to adjust the position of the cutting tool relative to the work piece in at least a radial sense, the frame drive means and the cutting tool drive means being operable to cause the cutting tool support means to rotate about the work piece and for the rotating cutting tool to machine a surface of revolution of the work piece.

2. A machine tool as claimed in claim 1 in which the inner and outer bearings of both bearing means are split into at least two parts.

3. A machine tool as claimed in claim 2 in which the outer bearings of both bearing means are formed in two parts pivotally attached together and having clamping means to hold the two parts together.

4. A machine tool as claimed in claim 1 in which the clamping means includes a plurality of radially movable first jaws actuated by a rotatable cam plate provided with a locking mechanism.

5. A machine tool as claimed in claim 4 in which each said first jaw has a pin engagable in a slot provided in the cam plate.

6. A machine tool as claimed in claim 4 in which the clamping means includes a plurality of individually movable second jaws, each said second jaw having an inclined surface engagable by a screw having a correspondingly inclined surface.

7. A machine tool as claimed in claim 1 in which the drive means for rotatably driving the cutting tool comprises a ring gear attached to one of the outer bearings, arranged to be driven by an air motor through a gear box and output pinion.

8. A machine tool as claimed in claim 1 in which the cutting tool support means includes a shaft upon which the cutting tool is mounted, an inner housing in which the shaft is rotatably mounted and an outer housing within which the inner housing is mounted, the feed means including an actuating means to rotate the inner one of said housings.

9. A machine tool as claimed in claim 8 in which the actuating means comprises a lead screw engagable with a nut movable with the inner one of said housings.

10. A machine tool as claimed in claim 1 in which the feed means includes a lateral actuating mechanism arranged to move the cutting tool in a longitudinal direction.

11. A machine tool as claimed in claim 1 having two cutting tools mounted on a common drive spindle.

12. A machine tool as claimed in claim 1 having two pairs of cutting tools, the tools of each pair being mounted on common drive spindles, one of said pair of cutting tools being arranged to provide a roughing cut and the other pair of said cutting tools being arranged to provide a finishing cut on respective diameters of a work piece.

13. A machine tool comprising a frame arranged to be secured to and to be rotatable upon a work piece, the frame including bearing means located adjacent each end of the frame, each bearing means comprising an outer bearing attached to and rotatable with the frame, the outer bearings being formed in two parts pivotably attached together and having clamping means to hold the two parts together, and an inner bearing having clamping means arranged to attach each inner bearing to a work piece at spaced apart locations, said inner bearings being split into at least two parts, and driving means arranged to drive the frame relative to the work piece, the frame including at least one cutting tool support means including a rotatable shaft, at least one rotatable milling cutting tool being mounted on the rotatable shaft which is eccentrically mounted in two housings, the shaft being arranged to be driven by drive means, including an air motor, through a reduction gear box attached to one of said housings, the cutting tool also having feed means to adjust the position of the cutting tool relative to the work piece in at least a radial sense, the frame drive means and the cutting tool drive means being operable to cause the cutting tool support means to rotate about the work piece and for the rotating cutting tool to machine a surface of revolution of the work piece.

* * * * *